March 31, 1970 A. LAWSON 3,503,514
APPARATUS FOR SEPARATING MIXED LIQUIDS
Original Filed March 31, 1966 3 Sheets-Sheet 1
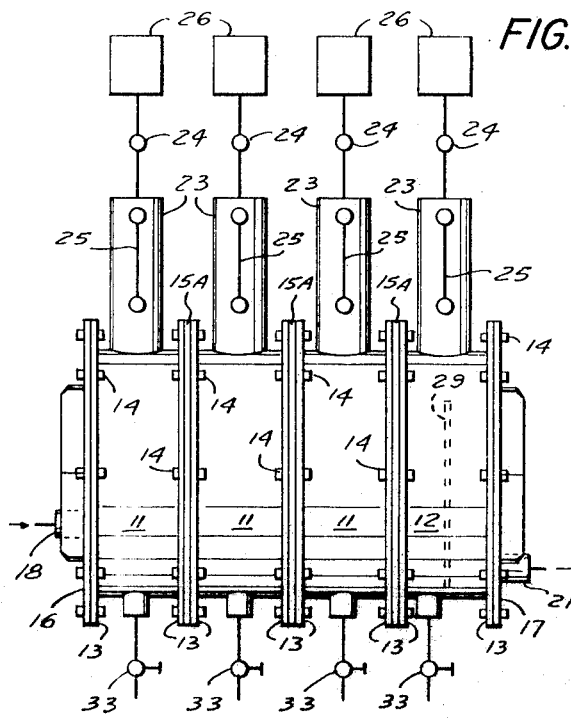
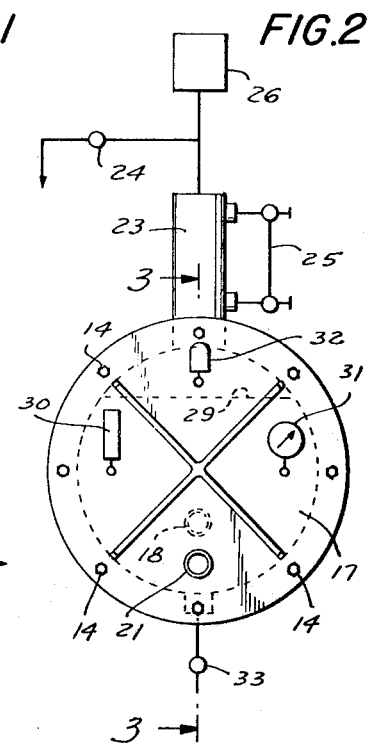
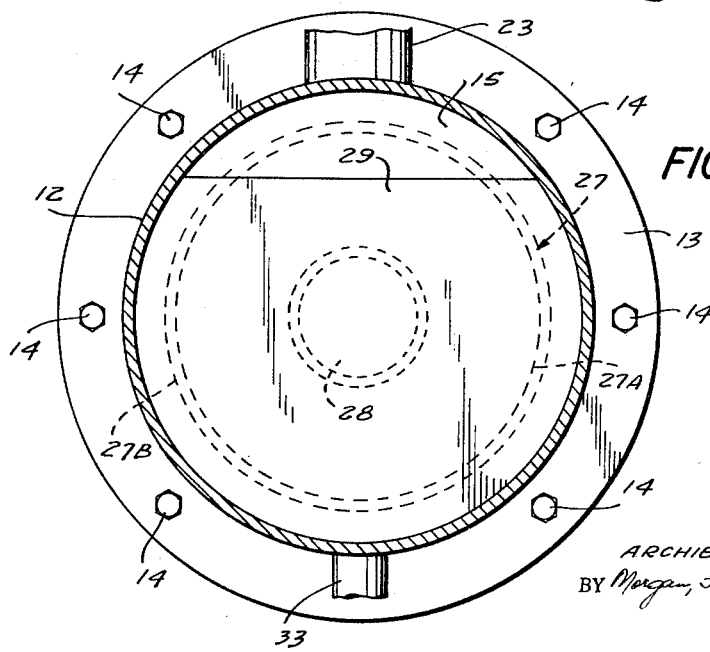
INVENTOR.
ARCHIBALD LAWSON
ATTORNEYS March 31, 1970  A. LAWSON  3,503,514
APPARATUS FOR SEPARATING MIXED LIQUIDS
Original Filed March 31, 1966  3 Sheets-Sheet 2

INVENTOR.
ARCHIBALD LAWSON
BY Morgan, Finnegan, Durham & Pine

ATTORNEYS

March 31, 1970    A. LAWSON    3,503,514
APPARATUS FOR SEPARATING MIXED LIQUIDS
Original Filed March 31, 1966    3 Sheets-Sheet 3

INVENTOR
ARCHIBALD LAWSON
BY
ATTORNEYS

United States Patent Office 3,503,514
Patented Mar. 31, 1970

3,503,514
APPARATUS FOR SEPARATING MIXED LIQUIDS
Archibald Lawson, R.F.D. Rymph Road,
Staatsburg, N.Y. 12580
Continuation of application Ser. No. 539,129, Mar. 31, 1966. This application Mar. 20, 1968, Ser. No. 714,609
Int. Cl. B01d 23/06
U.S. Cl. 210—301                    12 Claims

ABSTRACT OF THE DISCLOSURE

An apparatus for separating mixed liquids of different specific gravities particularly small amounts of oil from water at low rates of flow wherein a series arrangement of foraminous spool-like separator-coalescer elements are oriented in a housing with their axes horizontally disposed for serially treating a generally horizontal liquid flow and a baffle plate is preferably provided just prior to the outlet of the housing to effect final gravity separation.

---

This application is a continuation of copending application Ser. No. 539,129, filed Mar. 31, 1966, now abandoned.

This invention relates generally to improvements in apparatus for separating mixed liquids of different specific gravities, and especially for separating oil from water.

Apparatus of the type here concerned usually comprises a number of separator-coalescer elements each having foraminous cylindrical walls through which the liquid mixture flows. The foraminous mass causes one liquid constituent of the mixture to coalesce into coarse globules which depending upon their specific gravity relative to the other constituent of the mixture, either rise to the top or fall to the bottom of the apparatus where they can be drawn off and collected. Customarily, the separator-coalescer elements are arranged either concentrically or in series with their axes vertically disposed. Apparatus of the concentric type is disclosed in Patents No. 2,432,317 issued Dec. 9, 1947, and No. 2,651,414, issued Sept. 8, 1953, while apparatus of the series type is disclosed in Patent No. 3,055,505, issued Sept. 25, 1962.

In designing liquid separating apparatus for particular installations, the gross output requirements are an important consideration. The capacity of the apparatus, i.e. its ability to efficiently separate mixed liquids at specific flow rates, varies with the amount of foraminous material available for separating and coalescing purposes. Hence, as the output requirements either increase or decrease from installation to installation, so too should the size and/or number of the foraminous elements. Although apparatus of the type described in the aforementioned patents have proven to be highly efficient when designed for handling relatively high rates of liquid flow, such apparatus have been generally unsatisfactory when designed for handling relatively low rates of flow. The efficiency at low flow rates could be increased by increasing the size and/or number of the foraminous elements but the additional cost involved makes such a solution impractical.

Accordingly, it is an object of this invention to provide apparatus for separating mixed liquids of different specific gravities which can be relatively inexpensively produced for highly efficient separation at low rates of flow.

It is a further object of this invention to provide apparatus of a modular type construction for separating mixed liquids of different specific gravities, whereby the capacity of the apparatus at a particular installation can be increased at a minimum cost subsequent to initial installation to meet increased output requirements not originally anticipated.

It is still a further object of this invention to provide apparatus of the type characterized which is simple in construction, can be easily mass produced and is inexpensive to install and maintain.

These and other objects, features and advantages are accomplished, according to the invention, by the arrangements and combinations of elements hereinafter fully described and particularly recited in the claims, and will become more apparent therefrom.

As used herein, the term "coalescing chamber" refers to a chamber having at least one separator-coalescer element positioned therein; the term "gravitation chamber" refers to a chamber having a wall or baffle plate therein for effecting gravity separation of the liquid constituents of the mixture; and the term "separating chamber" is a generic designation for both.

Briefly and generally, the apparatus in accordance with the invention comprises a housing divided by at least one vertical partition into successive separating chambers including at least one coalescing chamber and at least one gravitation chamber, each chamber having an outlet in the housing for the passage of the coalesced liquid out of the chamber by gravity. The mixed liquid flows through the apparatus in a generally horizontal direction, first through the coalescing chamber and then through the gravitation chamber. Each coalescing chamber is provided with a cylindrical foraminous separator-coalescer element horizontally disposed therein and depending from the vertical partition forming the rear wall of the chamber. The axial opening of the separator-coalescer element communicates with the next chamber through a transfer port formed in the partition from which it depends. The other end of the axial opening is closed off so that the liquid will flow radially inwardly through the foraminous wall of the element towards the transfer port. Each gravitation chamber is subdivided by a baffle plate extending intermediate the transfer port forming the entrance to the chamber and an outlet port for the uncoalesced liquid constituent of the mixture so that the inflowing mixture is directed first towards the outlet port for the coalesced liquid and then through a change of direction towards the outlet for the uncoalesced liquid, gravity separation of the liquid mixture constituents thereby being effected.

Preferably, for oil-water separation at low flow rates, the housing is divided into three coalescing chambers and one gravitation chamber, each of the coalescing chambers having but one separator-coalescer element of relatively small axial dimension and of substantial wall thickness.

Preferably, a modular construction is used for the housing so that chambers can easily be added or removed to suit the output requirements of particular installations. The chambers are formed by releasably securing substantially similar open-ended housing sections together with partitions releasably positioned between adjacent sections, a closed housing being formed in conjunction with a pair of removable end walls.

Having briefly described the invention, a more detailed description is now made by reference to an exemplary embodiment thereof illustrated in the accompanying drawings which form a part of the specification, wherein:

FIGURE 1 is a partially diagrammatic side elevational view of the apparatus;

FIGURE 2 is a diagrammatic end elevational view of the apparatus of FIGURE 1;

FIGURE 5 is a transverse vertical sectional view taken along line 5—5 of FIGURE 3.

Figure 3:
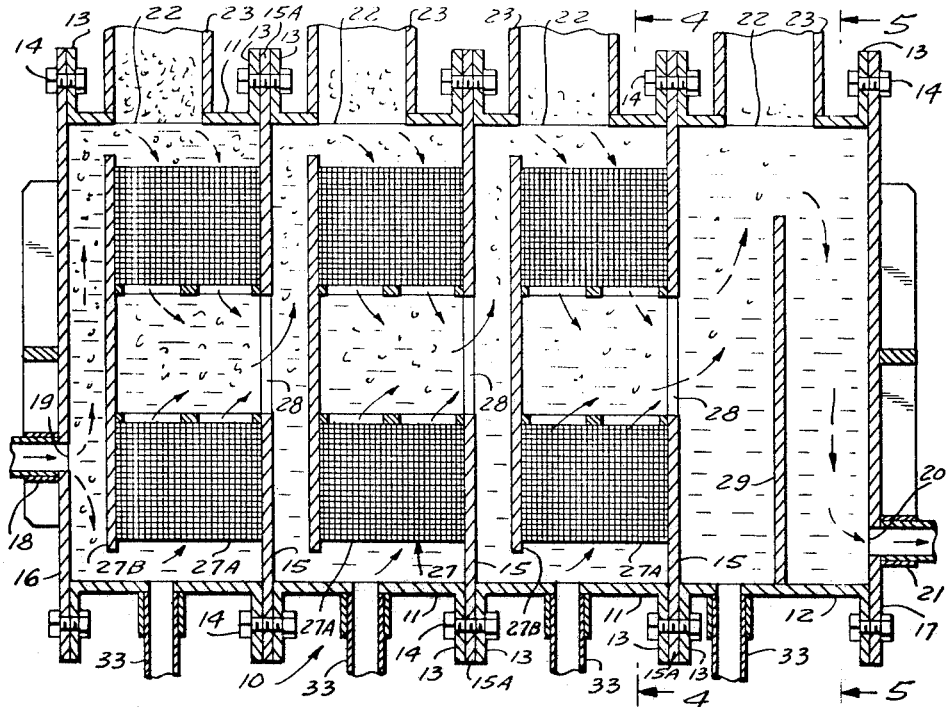
FIGURE 3 is a longitudinal vertical sectional view of the apparatus taken centrally thereof along line 3—3 of FIGURE 2.
Figure 4:
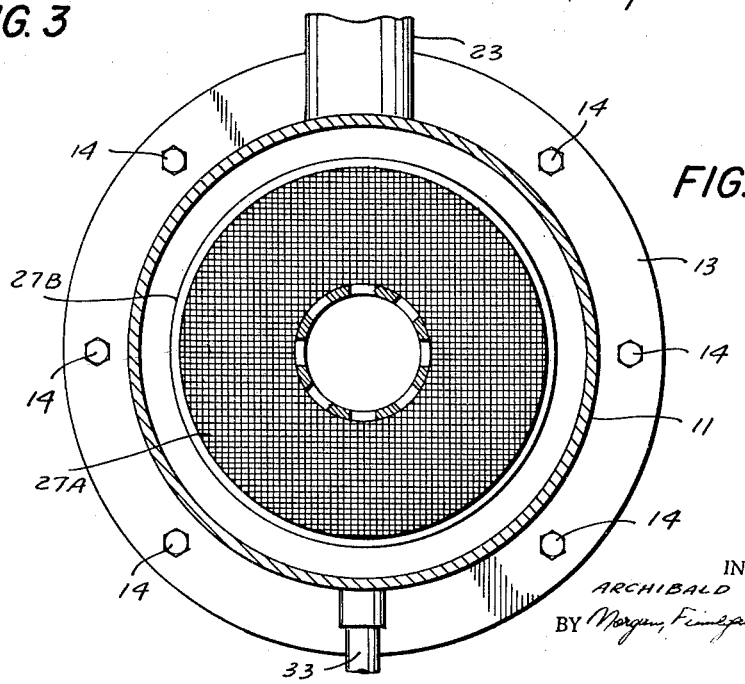
FIGURE 4 is a transverse vertical sectional view taken along line 4—4 of FIGURE 3.
Figure 6:
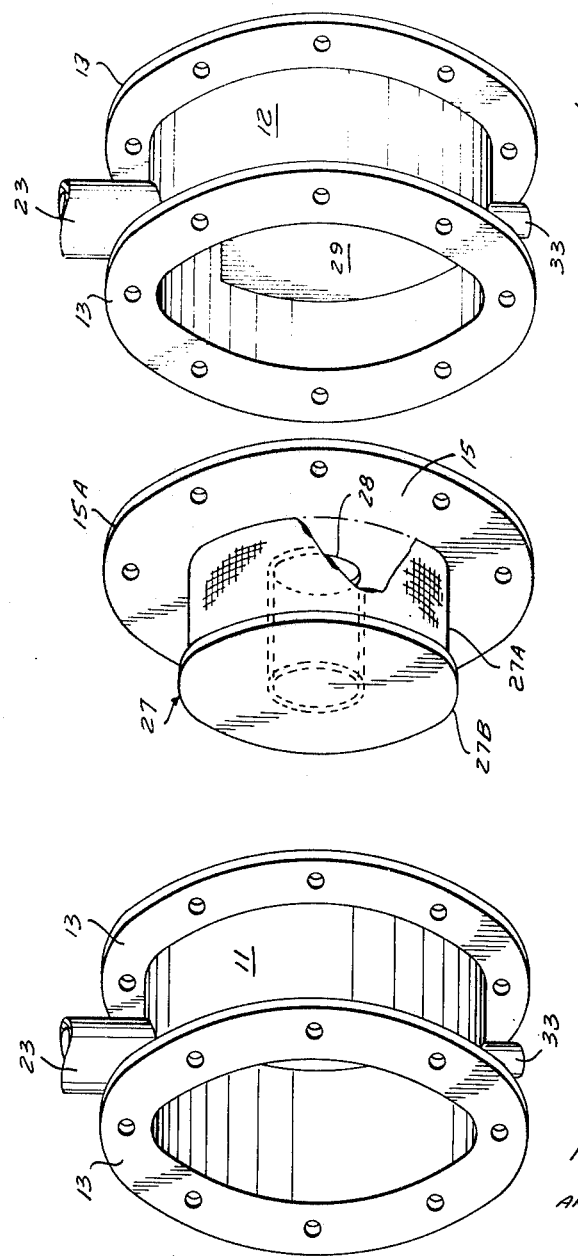
FIGURE 6 is a perspective assembly illustration of a coalescing chamber and adjacent gravitation chamber.

Turning now to the drawings wherein like reference characters are employed to designate like parts in the several figures, there is illustrated liquid separating apparatus particularly adapted for separating oil from water in an oil-water mixture entering at relatively low rates of flow. An elongated housing 10 illustrative of a cylindrical configuration and divided by vertical walls or partitions 15 into four successive separating chambers is provided for the apparatus. The mixture enters the housing through an inlet port 19 and thereafter flows in a generally horizontal direction through the four chambers. The separated oil floats to the top of the charbers where it is collected in reservoirs 23. The water, in an oil-free condition, leaves the housing through an outlet port 20.

The housing for the apparatus is of a modular construction so that separating chambers can be added as desired to particular installations to meet increases in output requirements not originally anticipated. The coalescing chambers are surrounded by substantially similar open-ended cylindrical wall sections 11 having outwardly extending annular flanges 13 integral with the ends thereof. A relatively large opening or outlet 22 is formed at the top of each section 11 for passing oil out of the chamber therein. Reservoirs 23 are welded to the wall sections 11 so as to surround outlets 22. The gravitation chamber is similarly surrounded by a cylindrical wall section 12 including flanges 13 and an outlet 22 with an associated reservoir 23. Each of sections 11, 12 are further provided with bottom drains 33 for removal of waste material from the chambers. In the assembled housing cylindrical wall sections 11, 12 are releasably joined by bolts 14 passing through suitable holes in flanges 13.

The walls or partitions 15 dividing the housing into individual chambers are each in the shape of an annulus with an outer diameter approximately the same as that of flanges 13 and a central opening or transfer port 28 providing communication between adjacent chambers. The portion 15A of each of the partitions 15 which extends beyond the cylindrical walls of the sections 11, 12 is provided with holes for accomodating the bolts which join flanges 13 of adjacent sections. In the assembled structure the partitions are conveniently positioned between the flanges of adjacent cylindrical wall sections with portions 15A serving as gaskets for sealing the housing against escape of liquid.

The first of the wall sections 11 and the wall section 12 are bolted to end walls 16 and 17 respectively to provide a fully enclosed housing. Front end wall 16 is provided with a pipe coupling 18 which surrounds inlet port 19 for the introduction of the mixed liquid to the first coalescing chamber of the housing. Pipe coupling 18 may include a check valve and suitable prestraining apparatus if desired. Similarly, rear end wall 17 is provided with a pipe coupling 21 surrounding outlet port 20 for the passage of the oil-free liquid.

Each of the coalescing chambers with housing sections 11 is provided with a horizontally disposed separating and coalescing element 27. The separator elements are each of cylindrical construction having an axial opening with walls 27A of annular cross-section. Preferably, for handling low rates of flow, each chamber has but one separator element with walls 27A of substantial thickness as in the illustrative embodiment. The walls consist of strands of mesh or foraminous material wound around a foraminous base. Each of the separator elements depends perpendicularly from the partition 15 forming the rear wall of the chamber forwardly. The free or forward end of the element, which is spaced apart from the front wall of the chamber, is formed with a circular end or baffle plate 27B of diameter slightly larger than the outer diameter of the element closing off the axial opening of the element at that end from the liquid within the chamber. The separator-coalescer element is positioned on partition 15 with its cylindrical wall 27A surrounding transfer port 28. With this arrangement, inflowing liquid must pass radially inwardly through the foraminous cylindrical wall 27A of the element towards its axial opening to reach the next chamber.

The final gravitation section 12 is formed with a baffle plate 29 upstanding therein. Baffle plate 29 extends transversely of the cylindrical section 12 intermediate the front partition of the chamber and the rear end wall 17 of the housing with its top spaced apart from the top of the cylindrical wall of section 12 to subdivide the chamber except at the top thereof. Liquid entering the chamber through transfer port 28 is directed upwardly towards the oil reservoir 23 where upon reaching the top of baffle plate 29, the liquid of higher specific gravity, e.g., water, is directed downwardly toward outlet port 20 at the bottom of rear end wall 17. The liquid of lower specific gravity, e.g. oil, separates from the heavier liquid and continues upwardly out of the housing to collect in resevoir 23.

As shown diagrammatically in FIGURE 1, each of reservoirs 23 communicates with an outlet via a drain control valve 24. A glass gage 25 or its equivalent may be provided for each reservoir 23 for determining the amount of oil present therein. Atmosphere pressure is maintained within reservoirs 23 by air eliminators 26 operatively coupled thereto.

As illustrated in FIGURE 2 the apparatus may be provided with a thermometer 30, pressure gage 31, relieve valve 32 and any other suitable measurement and control devices for maintaining efficient operation.

As mentioned hereinabove, the apparatus of the instant invention is specifically intended to provide efficient separation of oil from water at low flow rates, as for example, at flow rates of 20 g.p.m. or below. Fully efficient operation at these flow rates can be obtained with three coalescing chambers and one gravitation chamber as illustrated in the drawing.

In the operation of the apparatus, e.g. to separate oil from water wherein the oil is of lower specific gravity than the water, the mixture of water and oil is delivered into the first coalescing chamber through inlet port 19 in front end wall 16. The mixture flows around end plate 27B and then radially inwardly through the foraminous wall of separator-coalescer element 27 toward the axial opening and through transfer port 28. The larger oil globules tend to float toward the oil reservoir at the top of the chamber as the mixture moves toward the separator-coalescer element. Furthermore, the foraminous wall tends to prevent passage of the large oil globules and thereby assists in the initial collection of oil at the top of the chamber. The remainder of the mixture with the smaller oil particles passes through the foraminous wall of the separator-coalescer element where these smaller particles are retarded by contact with the mesh material forming the wall. The particles tend to gather together and coalesce forming larger oil globules. A substantial portion of the coalesced oil rises upwardly through the foraminous wall and escapes radially outwardly at the top of the element to pass through outlet 22 at the top of the housing into the reservoir for collection.

The operation in the successive coalescing chambers is similar. The larger oil globules float to the top as the mixture travels around the end plate and enters the separator-coalescer element. The smaller oil particles are thereafter coalesced as they pass through the foraminous wall.

The oil globules formed as the mixture passes through the final coalescing chamber are separated from the water in the gravitation chamber. The mixture flows from transfer port 28 up and over baffle plate 29 toward exit port 20 near the bottom of the chamber. As the mixture flows toward the top of the chamber, the oil globules rise and then continue to float toward the oil collection reservoir. The oil free liquid then leaves the chamber via exit port 20.

After a suitably prolonged period of use, it is desirable to cleanse the interior of the housing sections 11, 12 and especially the foraminous walls of the separator elements. This may be done by first disconnecting the liquid mixture supply and closing all discharge outlets. Then live steam is discharged under pressure into the housing through inlet port 19 and outlet port 20 successively. The steam will churn the liquid within the housing with strong washing and cleansing effect. Drains 33 which are provided for each chamber to lead outwardly from the bottom of the housing are opened to drain away the liquid.

Since variations may be made in the embodiment of the invention illustrated and described herein, it is to be understood that the invention is not restricted to the details thereof.

For example, the configuration of the separator-coalescer elements as well as their arrangement within the chambers can be varied considerably at the discretion of the designer so long as there is at least one cylindrical element in each chamber arranged in a generally horizontal orientation with flow of liquid moving radially inwardly through the wall of the element to its axial opening and then horizontally to the next chamber. Furthermore, the number of coalescing chambers and gravitation chambers may be varied as desired as long as there is at least one of each type.

The invention is particularly defined in the appended claims.

What is claimed is:

1. Apparatus for separating mixed liquids of different specific gravities, particularly small amounts of oil from relatively large amounts of water at low rates of flow, comprising
   (a) a closed housing having a horizontal flow path and a horizontal major axis and divided by at least one vertical partition into successive separating chambers including a coalescing chamber and a gravitation chamber, said partition having a transfer port therein for communication between adjacent chambers,
   (b) each of said chambers having an outlet for gravitational flow of coalesced oil or the like out of the chamber,
   (c) said coalescing chamber having a liquid mixture inlet and a spool-like foraminous separator-coalescer element including strands of mesh wound around an annular wall having openings formed therein and having an axial opening, said element depending from the vertical partition with its annular wall surrounding said transfer port,
   (d) said separator-coalescer element being closed off at its free end from the liquid mixture within said chamber so that the mixture flows from said inlet around said closed off end and radially inwardly through the foraminous wall of said separator-coalescer element into said gravitation chamber via said transfer port,
   (e) said gravitation chamber having an outlet for water or the like and a baffle plate extending therein intermediate said transfer port and said outlet for directing the inflowing liquid from said transfer port through a change of direction whereby final gravity separation of the liquid constituents is effected.

2. Apparatus as defined in claim 1 wherein said housing is subdivided by vertical partitions into three coalescing chambers and a gravitation chamber interconnected for successive treatment of a generally horizontal liquid flow.

3. Apparatus as defined in claim 1 including a plurality of vertical partitions subdividing said housing into a plurality of coalescing chambers and a final gravitation chamber interconnected for successive treatment of a generally horizontal liquid flow, each of said coalescing chambers having but one separator-coalescer element, each of said separator-coalescer elements having a relatively short and diametrically extensive outer configuration.

4. Apparatus as defined in claim 1 wherein said outlets for oil or the like are at the top of said housing and said baffle plate extends vertically upwardly from the bottom of said gravitation chamber.

5. Apparatus for separating mixed liquids of different specific gravities, particularly small amounts of oil from relatively large amounts of water at low rates of flow, comprising
   (a) a closed housing having a horizontal major axis divided by at least one vertical partition into successive separating chambers including at least one coalescing chamber and at least one gravitation chamber, said housing having a liquid mixture inlet at one of its ends and an outlet for the remaining constituent of the liquid mixture such as water or the like at its other end, each partition having a transfer port therein for liquid flow between adjacent chambers,
   (b) each of said chambers having an outlet for gravitational flow of one constituent of said liquid mixture such as coalesced oil or the like out of the chamber,
   (c) each coalescing chamber having a cylindrical foraminous separator-coalescer element including a length of material wound around a base structure having openings formed therein and defining an axial opening, said separator-coalescer element depending from a partition forming one wall of said chamber with its said annular wall surrounding the transfer port of said chamber, said axial opening being closed off at said free end so that the liquid mixture is caused to flow through said foraminous wall in order to pass through said chamber,
   (d) said gravitation chamber having a baffle plate suitably disposed therein for directing the inflowing liquid through a change of direction whereby gravity separation of the liquid constituents of the mixture is effected.

6. Apparatus as defined in claim 5, wherein the axial dimension of each of said separator-coalescer elements is no greater than its diametrical dimension.

7. Apparatus as defined in claim 6 wherein said length of material is adapted to promote coalescence of one constituent of said mixture.

8. Apparatus as defined in claim 7 wherein said length of material is in the form of a mesh.

9. Apparatus as defined in claim 7 wherein said housing is subdivided by vertical partitions into a plurality of coalescing chambers and but one gravitation chamber.

10. Apparatus as defined in claim 9 wherein said gravitation chamber comprises one end chamber of said housing.

11. Apparatus as defined in claim 10 having three coalescing chambers.

12. Apparatus as defined in claim 11 wherein said length of material is in the form of a mesh.

References Cited

UNITED STATES PATENTS

| 1,665,164 | 4/1928 | Gard et al. | 210—336 |
| 2,875,900 | 3/1959 | Henkel et al. | 210—307 X |
| 2,933,191 | 4/1960 | Rohr | 210—309 |
| 3,030,302 | 4/1962 | Turnbull | 210—494 X |
| 3,055,505 | 4/1962 | Lawson | 210—335 |
| 2,960,234 | 11/1960 | Frederickson | 210—23 X |
| 3,407,937 | 10/1968 | Bakker et al. | 210—301 |

FOREIGN PATENTS

| 800,796 | 9/1958 | Great Britain. |

REUBEN FRIEDMAN, Primary Examiner

F. A. SPEAR, Jr., Assistant Examiner

U.S. Cl. X.R.

210—307, 320, 336, 497.1